(12) United States Patent
Kumai

(10) Patent No.: US 8,467,017 B2
(45) Date of Patent: *Jun. 18, 2013

(54) POLARIZING ELEMENT, METHOD FOR PRODUCING SAME, LIQUID CRYSTAL DEVICE, ELECTRONIC APPARATUS, AND PROJECTION DISPLAY

(75) Inventor: Yoshitomo Kumai, Okaya (JP)

(73) Assignee: Seiko Epson Corporation (JP)

(*) Notice: Subject to any disclaimer, the term of this patent is extended or adjusted under 35 U.S.C. 154(b) by 838 days.

This patent is subject to a terminal disclaimer.

(21) Appl. No.: 12/630,270

(22) Filed: Dec. 3, 2009

(65) Prior Publication Data

US 2010/0149443 A1 Jun. 17, 2010

(30) Foreign Application Priority Data

Dec. 17, 2008 (JP) ................... 2008-320951

(51) Int. Cl.
*G02F 1/1335* (2006.01)

(52) U.S. Cl.
USPC .............. 349/96; 349/5; 349/8; 349/99

(58) Field of Classification Search
USPC ............. 349/5, 8, 96, 99; 216/24; 359/485; 427/163.1
See application file for complete search history.

(56) References Cited

U.S. PATENT DOCUMENTS

| 5,639,563 | A  | * | 6/1997  | Ohnuki et al. ............... 428/611 |
| 7,113,338 | B2 |   | 9/2006  | Kunisada et al. |
| 2007/0152358 | A1 | * | 7/2007 | Suganuma ................... 264/1.31 |
| 2008/0252825 | A1 | * | 10/2008 | Kim et al. ....................... 349/96 |
| 2009/0066885 | A1 | * | 3/2009 | Kumai ............................ 349/96 |
| 2010/0149441 | A1 | * | 6/2010 | Kumai .............................. 349/5 |

FOREIGN PATENT DOCUMENTS

| JP | 2005-181990 | 7/2005 |
| JP | 2005-242379 | 9/2005 |
| JP | 2007-148344 | 6/2007 |
| JP | 2007-171802 | 7/2007 |
| JP | 2007-178763 | 7/2007 |
| JP | 2009-069382 | 4/2009 |

* cited by examiner

*Primary Examiner* — Huyen Ngo

(74) *Attorney, Agent, or Firm* — Harness, Dickey & Pierce, P.L.C.

(57) ABSTRACT

A polarizing element includes a substrate; a plurality of protruded threads formed on one of surfaces of the substrate in a rough stripe pattern when viewed two-dimensionally, each of the protruded threads having a side surface forming a slope inclined with respect to the one surface of the substrate; a plurality of metal thin wires each formed on the slope of the each protruded thread so as to be cantilever-supported by the slope and each extended in an extension direction of the protruded thread; and a protection film covering the protruded threads and the metal thin wires.

12 Claims, 7 Drawing Sheets

POLARIZING ELEMENT, METHOD FOR PRODUCING SAME, LIQUID CRYSTAL DEVICE, ELECTRONIC APPARATUS, AND PROJECTION DISPLAY

CROSS-REFERENCE TO RELATED APPLICATION

This application is based on and claims priority from Japanese Patent Application No. 2008-320951, filed on Dec. 17, 2008, the contents of which are incorporated herein by reference.

BACKGROUND

1. Technical Field

The present invention relates to a polarizing element, a method for producing the polarizing element, a liquid crystal device, an electronic apparatus, and a projection display.

2. Related Art

A variety of electro-optical apparatuses use a liquid crystal device as a light modulation device. In widely known liquid crystal devices, a liquid crystal layer is provided between a pair of substrates opposing each other. Additionally, it is common for such a liquid crystal device to include a polarizing element inputting a predetermined polarized light to the liquid crystal layer and an alignment film controlling alignment of liquid crystal molecules when no voltage is applied.

Among known polarizing elements, there are a thin-film polarizing element and a wire-grid polarizing element. The thin-film polarizing element is produced by extending a film made of resin containing iodine or a dichroic dye in a single direction to allow molecules of iodine or the dichroic dye to be aligned in the extension direction. The wire-grid polarizing element is formed by densely laying nano-scale metal thin wires on a substrate made of a transparent material.

The wire-grid polarizing element is made of an inorganic material. Thus, due to its excellent thermal resistance, the wire-grid polarizing element is suitably used particularly as a thermally-resistant constituent member, such as a polarizing element for a light valve of a liquid crystal projector. JP-A-2005-242379 discloses a structural example of the wire-grid polarizing element thus characterized.

As described above, the wire-grid polarizing element is excellent in thermal resistance as compared to a polarizing element made of an organic material, but tends to deteriorate due to oxidization of metal thin wires. For example, when a liquid crystal projector including a wire-grid polarizing element is continuously used for a long hour, the polarizing element continues to intercept light from a light source for the long hour and thus, heat storage occurs in the polarizing element. As a result, the oxidization of the metal thin wires is accelerated, thereby promoting deterioration. In order to prevent the oxidization, there is also proposed a technique for coating the metal thin wires with a different material for protection.

On the other hand, optical characteristics of the polarizing element are influenced by a refractive index of a material provided around the metal thin wires, so that a material with a refractive index of 1 seems to be desirable. In other words, it is desirable to place the metal thin wires in an air (or a vacuum). In this case, however, optical characteristics seem to be reduced when a region between the metal thin wires is completely filled with a protection material to protect the polarizing element.

SUMMARY

An advantage of the invention is to provide a wire-grid polarizing element that prevents deterioration due to the oxidization of metal thin wires and minimizes reduction of optical characteristics, and another advantage of the invention is to provide a method for producing the polarizing element. Additionally, still other advantages of the invention are to provide a liquid crystal device, an electronic apparatus, and a projection display, each of which includes the polarizing element and thereby exhibits high display quality and high reliability.

In order to solve the above problems, a polarizing element according to a first aspect of the invention includes a substrate; a plurality of protruded threads formed on one of surfaces of the substrate in a rough stripe pattern when viewed two-dimensionally, each of the protruded threads having a side surface forming a slope inclined with respect to the one surface of the substrate; a plurality of metal thin wires each formed on the slope of the each protruded thread so as to be cantilever-supported by the slope and each extended in an extension direction of the protruded thread; and a protection film covering the protruded threads and the metal thin wires.

In the structure above, the protection film protects the metal thin wires. Preventing oxidization of the metal thin wires leads to suppression of reduction in optical characteristics of the polarizing element. Consequently, the polarizing element can obtain good optical characteristics.

In the polarizing element of the aspect, preferably, in a region between adjacent pairs of the protruded thread and the metal thin wire is formed a space that is not filled with the protection film.

In the structure above, since the space is formed in the region between the adjacent pairs of the protruded thread and the metal thin wire, a part between the metal thin wires remains unburied in the protection film, so that the polarizing element can have excellent optical characteristics.

In the polarizing element of the aspect, preferably, an upper end surface of the protruded thread is roughly flat, and the each metal thin wire is protruded from the slope toward the upper end surface of the protruded thread in a manner so as to cover at least a part of the upper end surface when viewed two-dimensionally.

In the above structure, a width of the metal thin wires can be set with high flexibility.

In the polarizing element of the aspect, preferably, parts of the protection film covering adjacent pairs of the protruded thread and the metal thin wire contact with each other at an upper portion of the space formed between the adjacent pairs of the protruded thread and the metal thin wire.

In the structure above, the space formed between the adjacent metal thin wires can enclose an air or an atmospheric gas upon formation processing (or a vacuum). Thereby, the polarizing element can have excellent optical characteristics.

In the polarizing element of the aspect, preferably, the protection film is made of a translucent insulation material.

In the structure above, the metal thin wires are insulated from any surrounding members. Accordingly, for example, when the polarizing element is incorporated in an electronic device, no unintended electric current flow occurs between wires of the electronic device and the metal thin wires of the polarizing element. Thus, the electronic device can exhibit stable performance.

In the polarizing element of the aspect, preferably, the metal thin wires are made of a metal selected among silicon, germanium, and molybdenum.

Since the above-mentioned materials are not oxidized, the polarizing element does not deteriorate and thus can be highly reliable. Particularly, when the polarizing element is used for an application purpose under a high temperature condition, oxidization reaction is promoted under the high temperature environment. However, the polarizing element made of any one of the above metals can be highly durable.

A method for producing a polarizing element according to a second aspect of the invention, the polarizing element includes a plurality of protruded threads formed on one of surfaces of a substrate in a rough stripe pattern when viewed two-dimensionally, and a mask formed on an upper portion of each of the protruded threads. The method includes forming a plurality of metal thin wires each extended along the each protruded thread, each of the metal thin wires being made of a metal material deposited both on one of side surfaces of the protruded thread and on one side surface of the mask adjacent to the one side surface of the protruded thread; removing the mask; and forming a protection film covering the metal thin wires by a chemical vapor deposition process in such a manner that a region between adjacent pairs of the protruded thread and the metal thin wire includes a space that is not filled with the protection film.

Upon formation of the metal thin wires, there remains a resist as the mask, which can prevent the metal material from being deposited on an unnecessary part. In addition, since the metal material is deposited both on the protruded thread and on the mask, there can be obtained a wide deposition area, whereby a sufficient amount of the metal material can be deposited. Furthermore, each metal thin wire formed on one side wall surface of each protruded thread is protruded in the region between adjacent ones of the protruded threads.

Furthermore, the CVD process is characterized by that a forming film rapidly grows (film formation proceeds at high speed), thus allowing high-speed film formation. As the formation of the protection film proceeds, a region between adjacent metal thin wires is narrowed by an amount of thickness of the protection film, resulting that a raw material gas can hardly be spread between the adjacent metal thin wires and between the adjacent protruded threads. Thus, the film formation reaction can hardly be caused between the adjacent pairs of the protruded thread and the metal thin wire where the raw material gas can hardly be spread. Then, at an upper end portion of the each metal thin wire exposed to the raw material gas, a formation reaction of the protection film can easily proceed. Accordingly, the formation reaction of the protection film proceeds preferentially at the upper end portion of the each metal thin wire, and the protection film grows in a manner so as to narrow an upper gap between the adjacent metal thin wires.

In this case, the region including the metal thin wires where the protection film is formed has an indented configuration with many concealed portions when viewed two-dimensionally. When the protection film is formed by the CVD process, the raw material gas is hardly spread in the concealed portions, leading to a delayed growth of the protection film. Additionally, when the formation reaction of the protection film proceeds preferentially at the upper end portions of the metal thin wires, the raw material gas cannot be further spread in the region between the adjacent pairs of the protruded thread and the metal thin wire. Accordingly, the film growth in the region therebetween stops and the region remains unburied in the protection film. Thus, while the metal thin wires are effectively protected by the protection film, the region where the growth of the protection film is delayed is not buried in the protection film to form the space. Therefore, the method of the second aspect can easily produce the polarizing element that includes the space in the protection film and thereby exhibits excellent optical characteristics.

In the method of the second aspect, preferably, the one side surface of the mask is a slope that covers at least a part of the upper portion of the each protruded thread when viewed two-dimensionally.

In the method above, the metal thin wire formed on the one side surface of the mask result in two-dimensionally overlapping with the upper portion of the each protruded thread. In short, the metal thin wires covering the upper portions of the protruded threads can be easily formed, and the width of the metal thin wires can be easily controlled.

Preferably, in the method of the second aspect, before the metal thin wire formation step, the protruded thread formation step forms a resist having a predetermined pattern on one of surfaces of a base member forming the substrate and etches the base member via the resist to obtain the substrate having the protruded threads formed in the predetermined pattern, and the mask formation step forms the mask by using a part of the resist left on the upper portion of each of the protruded threads.

In the method above, the mask can be formed simultaneously with formation of the protruded threads. This can simplify a process of producing the polarizing element and can facilitate formation of the resist mask matching a shape of the protruded threads.

A projection display according to a third aspect of the invention includes an illumination optical system that outputs light, a liquid crystal light valve that modulates the light, the polarizing element of the first aspect that receives the light modulated by the liquid crystal light valve, and a projection optical system that projects polarized light transmitted through the polarizing element on a projected surface.

In the structure above, the projection display includes the polarizing element having high thermal resistance, which can suppress heat-induced deterioration of the polarizing element and oxidization-induced deterioration accelerated by heating even when a high power light source is used. Therefore, the obtained projection display can be highly reliable and can have excellent display characteristics.

A liquid crystal device according to a fourth aspect of the invention includes a pair of substrates, a liquid crystal layer provided between the substrates, and the polarizing element of the first aspect formed on a surface of at least one of the substrates, the surface facing the liquid crystal layer.

In the structure above, the liquid crystal device of the fourth aspect includes the polarizing element having excellent optical characteristics and having high reliability achieved by protection of the metal thin wires.

An electronic apparatus according to a fifth aspect of the invention includes the liquid crystal device of the fourth aspect.

In the structure above, the electronic apparatus of the fifth aspect includes a display section and a light modulation unit having high display quality and high reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described.

First Embodiment

Figure 1A:
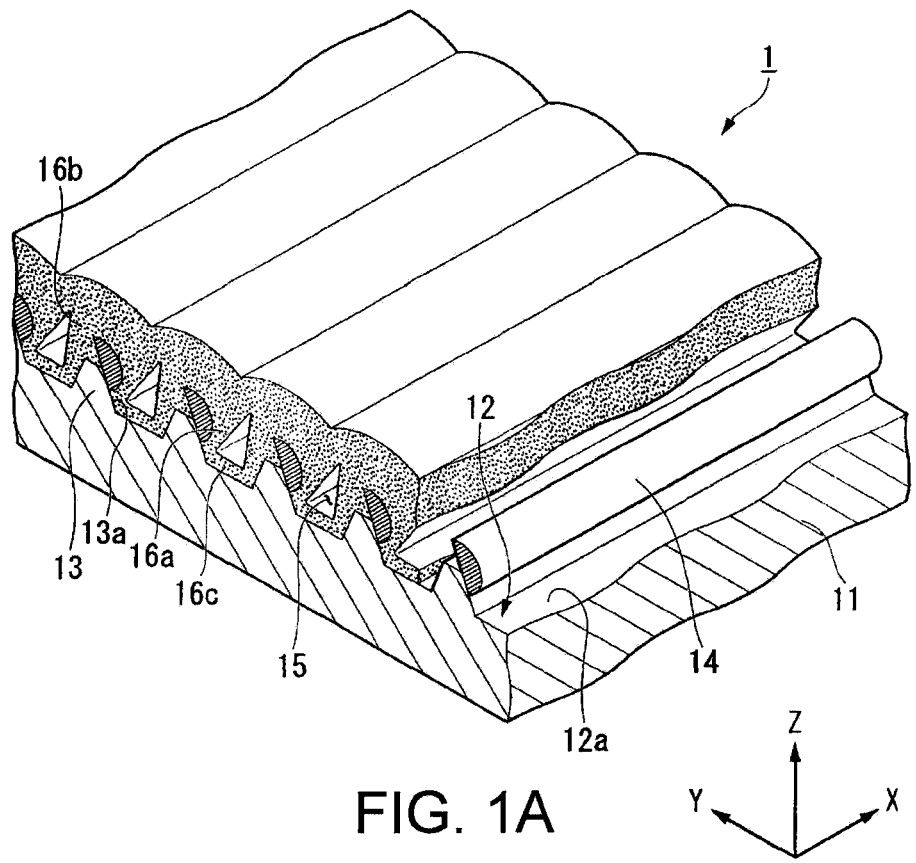
FIGS. 1A and 1B are schematic views showing a polarizing element according to an embodiment of the invention.
Figure 1B:
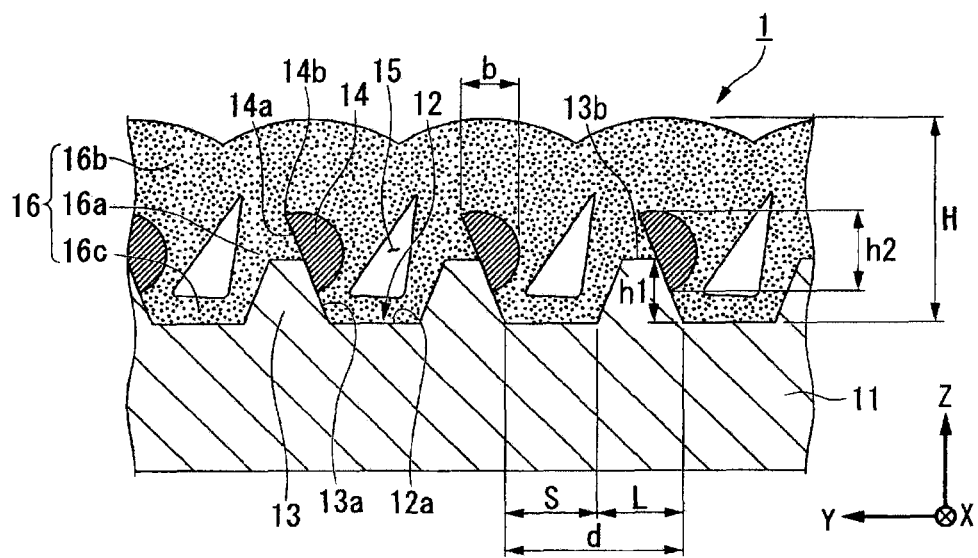

Hereinafter, descriptions will be given of a polarizing element according to a first embodiment of the invention and a method for producing the polarizing element of the first embodiment by referring to the drawings. FIGS. 1A and 1B are schematic views showing a polarizing element 1 of the first embodiment. FIG. 1A is a fragmentary perspective view of the polarizing element 1, and FIG. 1B is a fragmentary sectional view taken along a Y-Z plane of the polarizing element 1.

In the descriptions below, an XYZ coordinate system will be set, and based on the XYZ coordinate system, positional relationships between constituent members will be explained. In this case, a predetermined direction within a horizontal plane is referred to as an X-axis direction; a direction orthogonal to the X-axis direction within the horizontal plane is referred to as a Y-axis direction; and a direction orthogonal to each of the X-axis direction and the Y-axis direction is referred to as a Z-axis direction. In the present embodiment, an extension direction of metal thin wires corresponds to the X-axis direction, and an arrangement direction of the metal thin wires corresponds to the Y-axis direction. In addition, in all of the drawings referred to below, film thicknesses of constituent elements, a size ratio among the elements, and the like are changed according to needs.

Polarizing Element

As shown in FIG. 1A, the polarizing element 1 includes a substrate 11, a plurality of metal thin wires 14 extended in a single direction on the substrate 14, and a protection film 16 covering the metal thin wires 14.

The substrate 11 is made of a transparent material, such as glass, quartz, or plastic. Depending on application purposes of the polarizing element 1, heat storage occurs in the polarizing element 1, thereby causing a temperature increase in the polarizing element 1. Accordingly, preferably, the substrate 11 is made of a highly thermal resistant material, such as glass or quartz.

On a surface of the substrate 11 are formed a plurality of grooved portions 12 extended in the X-axis direction. A portion between adjacent ones of the grooved portions 12 corresponds to each of a plurality of protruded threads 13. The grooved portions 12 are formed at an equal interval in the Y-axis direction in a cycle shorter than a wavelength of visible light, and the protruded threads 13 are also formed in the same cycle.

Each of the metal thin wires 14 is provided on a side surface (a slope) 13a of the each protruded thread 13 to be formed in a manner extending in the X-axis direction, which is same as the extension direction of the protruded thread 13. The metal thin wire 14 transmits linearly polarized light vibrating in a direction orthogonal to the extension direction of the metal thin wire 14 (namely, in the Y-axis direction) and reflects linearly polarized light vibrating in the extension direction thereof 14 (namely, in the X-axis direction). The metal thin wire 14 is made of a metal such as aluminum.

On the substrate 11 is provided the protection film 16 covering surfaces of the substrate 11 and the metal thin wires 14. The protection film 16 is made of a translucent insulation film, such as a silicon oxide film. The protection film 16 includes a first protection film 16a covering a side surface 13a of the each protruded thread 13 and the each metal thin wire 14 and extended in the X-axis direction, a second protection film 16b covering the upper portion of the each metal thin wire 14 and extended in the X-axis direction, and a third protection film 16c covering a bottom surface 12a of each of the grooved portions 12 and extended in the X-axis direction.

Adjacent second protection films 16b are mutually connected in the Y-axis direction and integrated all together to cover entire upper surfaces of the metal thin wires 14. Each region surrounded by the first, the second, and the third protection films 16a, 16b, and 16c forms a space 15. An inside of the space 15 is filled with a vacuum, an air, or a raw material gas used upon formation of the protection film 16. A surface of the second protection film 16b not facing the substrate 11 reflects a pattern of the metal thin wires 14 to be slightly wavy, where portions two-dimensionally overlapping with the metal thin wires 14 rise and portions two-dimensionally overlapping with the spaces 15 fall.

As shown in FIG. 1B, the side surface 13a of the protruded thread 13 is formed so as to be inclined in a tapered manner in a direction receding from the bottom surface 12a. A top surface 13b of the protruded thread 13 is a flat surface approximately parallel to the bottom surface 12a of the grooved portion 12. Regarding sizes of the grooved portion 12 and the protruded thread 13, for example, a height h1 and a width L, respectively, of the protruded thread 13 are 100 nm and 70 nm, respectively, and a width S of the bottom surface 12a is 70 nm, and a cycle (a pitch) d including the grooved portion 12 and the protruded thread 13 is 140 nm.

In each metal thin wire 14, a part of an opposing surface 14a opposing the protruded thread 13 is provided on the side surface 13a of the protruded thread 13, whereas a remaining part of the opposing surface 14a is distant from the protruded thread 13. Additionally, an upper end portion of the metal thin wire 14 (an end portion thereof in the Z-axis direction) 14b is formed up to above the top surface 13b. The part of the opposing surface 14a not in contact with the side surface 13a two-dimensionally overlaps with the top surface 13b.

A width of the metal thin wire 14 is closely related to performance of the polarizing element 1. If the width of the metal thin wire 14 is controlled by a width in a +Y-axis direction from the side surface 13a, the width of the metal thin wire 14 can be increased only by the width of the grooved portion 12 at maximum. However, in the embodiment, since the metal thin wire 14 is formed so as to cover the top surface 13b, the width of the metal thin wire 14 can be set more flexibly. For example, the metal thin wire 14 may have a width b of 30 nm and a height h2 of 30 nm.

A height H from the bottom surface 12a to the upper surface of the second protection film 16b (the upper surface of the protection film 16) may be 200 nm, for example. In the present embodiment, the adjacent second protection films 16b are connected with each other, but alternatively, may not necessarily be connected with each other. For example, in another possible structure, a small gap may be formed between the adjacent second protection films 16b. In this case, the protection film 16 is formed for each of the metal thin wires 16, resulting that the plurality of protection films 16 extended in the X-axis direction are arranged in a large number of rows in the Y-axis direction at equal intervals.

A thickness of the first protection film 16a (a thickness thereof in the Y-axis direction) is set to a thickness in which adjacent first protection films 16a do not contact with each other in the Y-axis direction (namely, in which the space 15 is formed between the first protection films 16a). A width of the second protection film 16b in the Y-axis direction is made larger than widths of the protruded thread 13 and the metal thin wire 14 including the first protection film 16a in the Y-axis direction. Additionally, the third protection film 16c is formed integrally with the first and the second protection films 16a and 16b. Then, a void surrounded by the first, the second, and the third protection films 16a, 16b, and 16c is the space 15.

Figure 2A:
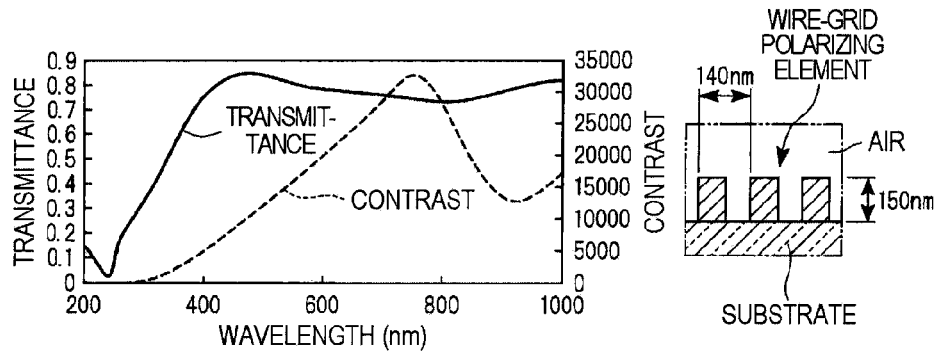
FIGS. 2A, 2B, and 2C are graphs and schematic structural views illustrating optical characteristic changes in polarizing elements having structural differences.
Figure 2B:
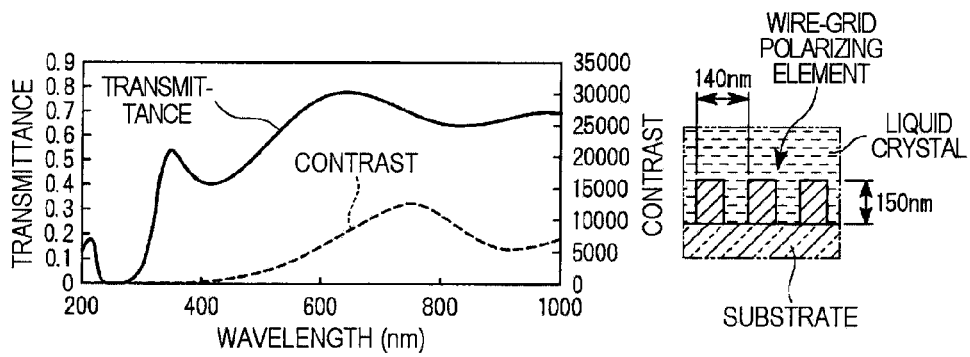
Figure 2C:
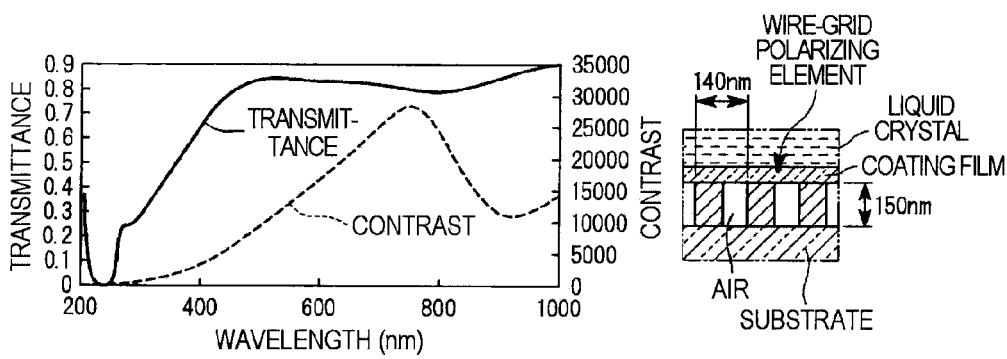

In general, optical characteristics of a polarizing element are influenced by a refractive index of a material arranged around metal thin wires and a desirable refractive index seems to be 1. FIGS. 2A, 2B, and 2C are illustrations showing optical characteristic changes due to the refractive index of a material arranged around metal thin wires included in respective wire-grid polarizing elements.

FIG. 2A is a graph and a schematic structural view showing optical characteristics (transmittance and contrast) of a wire-grid polarizing element in an air (the refractive index of 1). FIG. 2B is a graph and a schematic structural view showing optical characteristics of a wire-grid polarizing element in which liquid crystal (a refractive index of 1.6) is filled around the metal thin wires, and FIG. 2C is a graph and a schematic structural view showing optical characteristics of a wire-grid polarizing element in which a coating film ($SiO_2$) is formed between metal thin wires and liquid crystal in such a manner that the liquid crystal is positioned on the coating film.

The graphs shown in FIGS. 2A, 2B, and 2C each indicate a calculation result of a transmittance Tp obtained when inputting linearly polarized light having a vibration direction parallel to a transmission axis of the polarizing element in each of the mentioned-above conditions (a vibration direction vertical to the extension direction of the metal thin wire) and a calculation result of a contrast (Tp/Ts) obtained as a ratio between the transmittance Tp and a transmittance Ts of linearly polarized light in a vibration direction parallel to a reflection axis of the polarizing element.

As shown in FIG. 2A, it is found that the polarizing element with the metal thin wires placed in the air exhibits good characteristics in a visible light region. In contrast, in the condition of FIG. 2B where the liquid crystal is filled in an opening portion between the metal thin wires, a uniformity of transmittance is reduced in the visible light region, and particularly, there is a significant drop in a region of blue color (a region near a wavelength of 440 nm). This indicates that the optical characteristics are reduced when a material having a refractive index higher than 1 is arranged around the metal thin wires.

Additionally, in the polarizing element having the structure shown in FIG. 2C, the coating film ($SiO_2$) prevents the liquid crystal from being filled between the metal thin wires while an air is filled between the metal thin wires (or a vacuum is created between the wires). This structure causes no reduction in transmittance and contrast, as opposed to the structure shown in FIG. 2B, even though the wire-grid polarizing element is placed in the liquid crystal having the high refractive index. Thus, there can be provided good optical characteristics equal to those obtained in the structure of FIG. 2A.

In the polarizing element 1 of the embodiment, the region between the metal thin wires 14 is not filled with the protection film 16 and has the space 15.

Method for Producing Polarizing Element

FIGS. 3A to 3E and FIGS. 4A to 4D are illustrations of steps for producing the polarizing element 1. FIGS. 3A to 3E illustrate steps for forming the metal thin wires 14, and FIGS. 4A to 4D illustrate steps for forming the protection film 16. Each of the drawings corresponds to the sectional view of FIG. 1B.

Figure 3A:
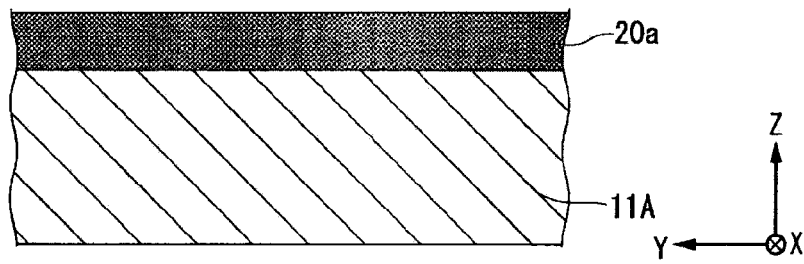
FIGS. 3A to 3E are sectional views illustrating steps for producing the polarizing element of the embodiment.

First, as shown in FIG. 3A, there is prepared a substrate member 11A, such as a glass substrate. Then, a resist material is applied on one of surfaces of the base member 11A by spin coating and then pre-baked to form a resist layer 20a. For example, the resist material may be a chemical amplification type positive photoresist: TDUR-P338EM (manufactured by Tokyo Ohka Kogyo Co., Ltd.). In the embodiment, the resist layer 20a has a width of 200 nm.

Figure 3B:
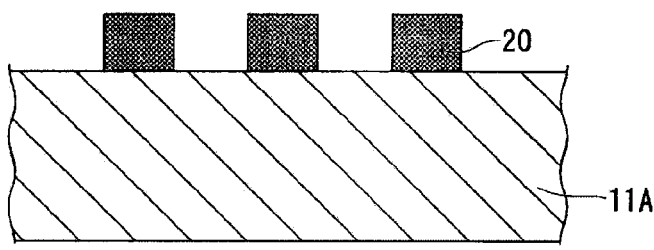

Next, as shown in FIG. 3B, for example, the resist layer 20a is exposed by a two-beam interference exposure system using a laser beam having a wavelength of 266 nm as an exposure light beam and then baked (post-exposure baking: PEB) to be developed. Thereby, there is formed a resist layer 20 having a striped pattern. The resist layer 20 of the embodiment has a height of 200 nm.

Figure 5:
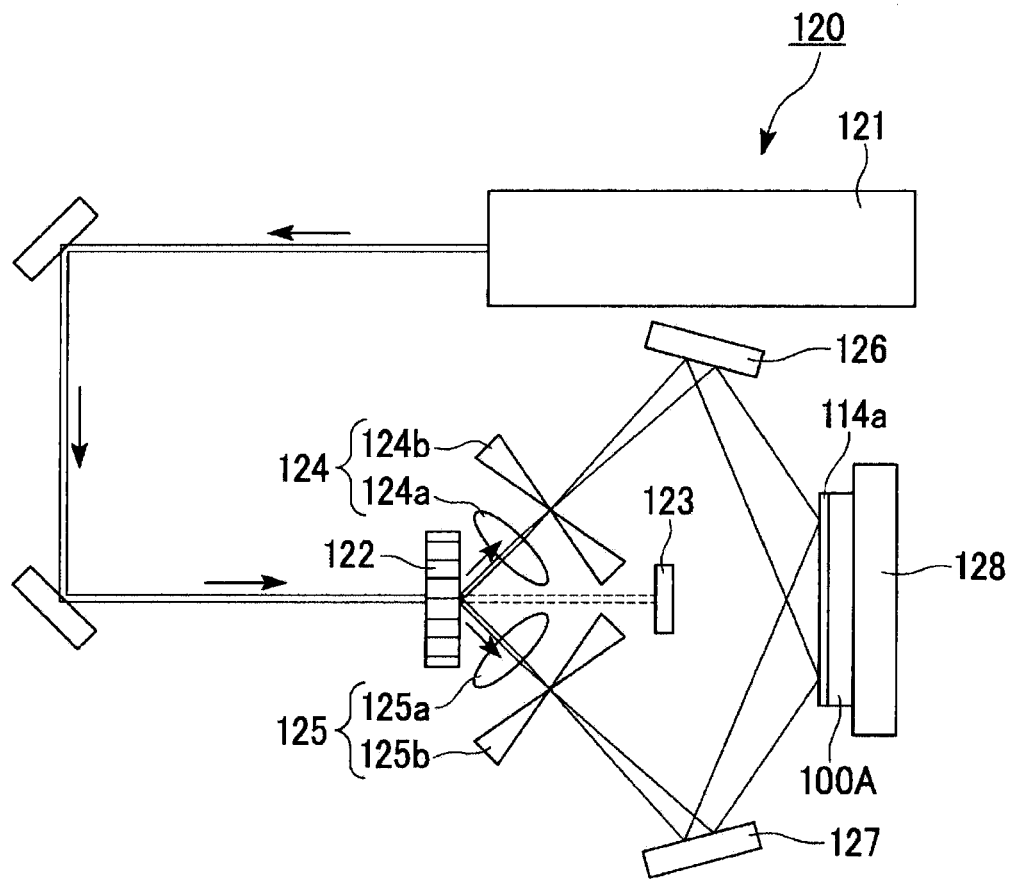
FIG. 5 is a schematic structural view showing an example of an exposure apparatus used to produce the polarizing element of the embodiment.

In this case, for example, an exposure apparatus used to perform the two-beam interference exposure system may be an exposure apparatus as shown in FIG. 5. An exposure apparatus 120 includes a laser light source 121 applying an exposure light beam, a diffraction beam splitter 122, a monitor 123, beam expanders 124 and 125, mirrors 126 and 127, and a stage 128 where the substrate 11 is to be mounted.

The laser light source 121 may be an Nd:YVO4 laser apparatus having a fourth-order harmonic wavelength of 266 nm, for example. The diffraction beam splitter 122 is a splitting unit generating two laser beams by splitting a single laser beam output from the laser light source 121. The diffraction beam splitter 122 is structured to generate two diffracted beams (±first order) having an equal intensity when an incident laser beam is TE polarized light. The monitor 123 receives light emitted from the diffraction beam splitter 122 to convert the received light into an electric signal. Based on the converted electric signal, the exposure apparatus 120 can adjust an intersection angle of the two laser beams and the like.

The beam expander 124 includes a lens 124a and a space filter 124b and expands a beam diameter of one of the two laser beams split by the diffraction beam splitter 122 to approximately 200 mm, for example. Similarly, the beam expander 125 also includes a lens 125a and a space filter 125b and expands a beam diameter of the other one of the two laser beams.

The mirrors 126 and 127, respectively, reflect a laser beam transmitted though the beam expanders 124 and 125, respectively, toward the stage 128. The mirrors 126 and 127 generate interference light by intersecting the laser beams to apply the interference light to the resist layer 20a on the substrate 11.

In this manner, the resist layer 20a can be exposed at a formation pitch narrower than the wavelength of the laser light source 121 by the exposure apparatus 120 applying the interference light onto the resist layer 20a.

Figure 3C:
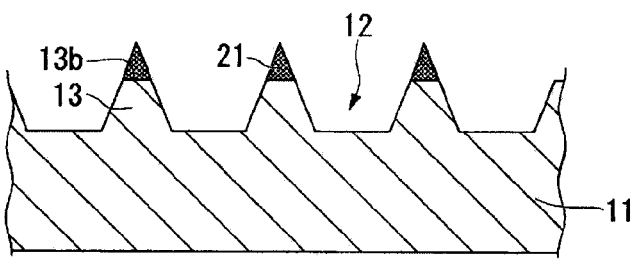

Next, as shown in FIG. 3C, by performing dry etching via the resist 20, the substrate material 11A is etched down by approximately 50 to 100 nanometers to perform a patterning of the substrate material 11A so as to form the substrate 11 having the grooved portions 12 and the protruded threads 13. In the present embodiment, the etching is performed to remove approximately 100 nanometers for the grooved portions 12. Additionally, in the dry etching, the resist 20 formed on the substrate material 11A is also etched, whereby a remaining resist 21 used as a mask in a later step remains on the top surface 13b of the protruded thread 13.

As an etching gas in the embodiment, a mixture gas is used that contains $C_2F_6$, $CF_4$, and $CHF_3$. As reaction conditions in etching, for example, a gas flow rate of $C_2F_6$:$CF_4$:$CHF_3$ is 20:30:30 sccm, discharge power is 300 W, pressure is 5 Pa, and reaction time ranges from 30 to 40 sec.

Figure 3D:
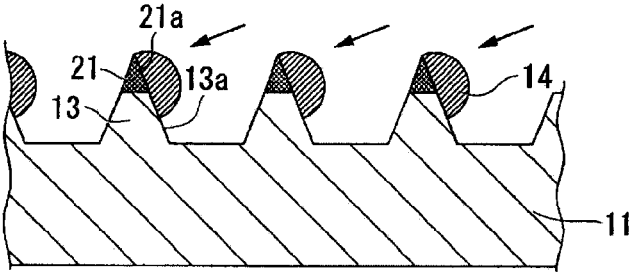

Next, as shown in FIG. 3D, a known magnetron sputtering apparatus is used to form the metal thin wires 14 in such a manner that each of the metal thin wires 14 straddles the side surface 31a of the protruded thread 13 and a side surface 21a of the remaining resist 21. In the drawing, each of arrows indicates a flying direction of sputtered particles. Due to the presence of the remaining resist 21, deposition of a metal film on an unnecessary portion can be prevented, as well as the sputtered particles can be deposited in the manner straddling both the side surfaces 13a and 21a. Thus, the metal thin wires 14 can be formed so as to have a large bottom area and a large volume.

The metal thin wires 14 are formed on an entire part of at least a region where the polarizing element is formed on the substrate 11. In order to form the metal thin wires 14, there may be used any of known oblique deposition methods, such as ion beam sputtering, other than magnetron sputtering. As reaction conditions in the embodiment, a gas flow rate of Ar is 10 sccm, discharge power is 1000 W, pressure is 0.1 Pa, and reaction time ranges from 2 to 4 min The metal thin wires 14 are formed on an entire part of at least a region where the polarizing element is formed on the substrate 11. In order to form the metal thin wires 14, there may be used any of known oblique deposition methods, such as ion beam sputtering, other than magnetron sputtering. As reaction conditions in the embodiment, a gas flow rate of Ar is 10 sccm, discharge power is 1000 W, pressure is 0.1 Pa, and reaction time ranges from 2 to 4 min.

In the embodiment, the metal thin wires 14 are made of aluminum. However, other than aluminum, silicon, germanium, or molybdenum may be suitable. When aluminum is used for the metal thin wires 14, deterioration may occur because aluminum is an easily oxidized metal although processing of aluminum is easy. Accordingly, among the metal materials mentioned above, silicon, germanium, or molybdenum hardly oxidized is preferably used, since those materials can prevent deterioration of the metal thin wires 14.

For example, when the polarizing element is used for a purpose in a high temperature state, an oxidization reaction is accelerated under the high temperature environment. However, when the metal thin wires 14 are made of any of the above materials, the polarizing element can have a high thermal resistance. In addition, according to needs, an alloy mainly containing those materials may be used for the material of the metal thin wires 14.

Figure 3E:
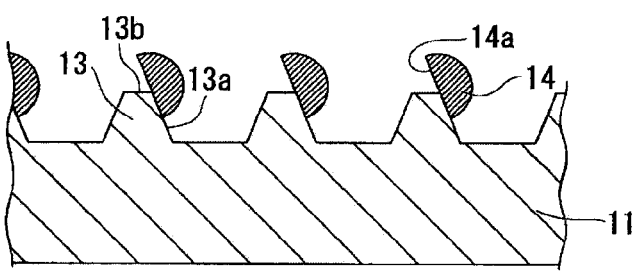

Next, as shown in FIG. 3E, ashing is performed to remove the remaining resist 21 remaining on the top surface 13b of the protruded thread 13. The removal of the remaining resist 21 exposes a part of the opposing surface 14a in contact with the side surface of the remaining resist 21 in the each metal thin wire 14, whereby the metal thin wire 14 contacts only with the side surface 13a of the protruded thread 13. As reaction conditions, a gas flow rate of $O_2$ is 50 sccm, pressure is 10 Pa, reaction time is 30 sec, and ICP/Bias power is 60/30 W.

Next, as shown in FIGS. 4A to 4D, the protection film is formed on the metal thin wires 14 by a chemical vapor deposition (CVD) process. In this case, as the method for forming the protection film 16, besides the CVD process, for example, evaporation or sputtering may be possible among commonly used methods. However, in the case of evaporation, an angle of a film raw material emitted to a forming surface of the protection film from an arrangement position of the film raw material in an evaporation device varies depending on positions on the forming surface, so that a distance between the film raw material and the forming surface is not exactly constant. Accordingly, a thickness of the produced protection film varies and thus, a quality of the polarizing element is not constant. Additionally, a film formation speed in sputtering is extremely slow, and therefore, it is difficult to obtain a film formation speed expected in the embodiment. As a result, the embodiment is possible when the CVD process is used for film formation.

Figure 4A:
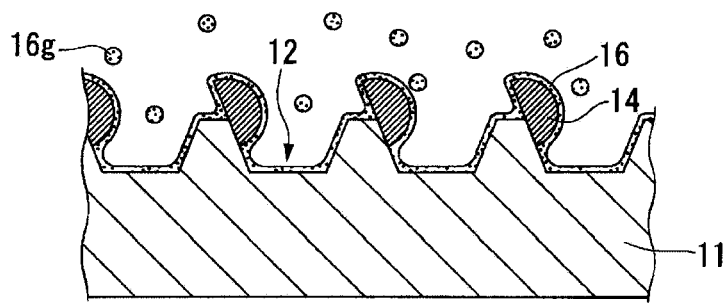
FIGS. 4A to 4D are also sectional views illustrating steps for producing the polarizing element of the embodiment.

First, as shown in FIG. 4A, the substrate 11 with the metal thin wires 14 is placed under a work environment of the CVD process and then a raw material gas 16g of the protection film 16 is supplied. The raw material gas 16g spreads down to the bottom surface 12a, thereby forming the protection film 16. In the embodiment, as the protection film 16, a silicon oxide film is formed, and the raw material gas 16g used is a mixture gas of tetraethoxysilane (TEOS) and oxygen $O_2$. In the drawing, TEOS and $O_2$ are both shown as the raw material gas 16g, without showing them distinctively from each other.

Other than silicon oxide, the protection film 16 may be made of an insulation material, such as silicon nitride (SiN), silicon nitrogen oxide (SiON), alumina ($Al_2O_3$), or the like. Then, in accordance with the material of the protection film 16 selected, the material of the raw material gas 16g can also be selected. In addition, the CVD process may be a thermal CVD process or a plasma CVD process. The present embodiment uses the plasma CVD process. In reaction conditions in the CVD process of the embodiment, for example, a gas flow rate of TEOS:$O_2$ is 12:388 sccm, power is 400 W, pressure is 40 Pa, reaction temperature is 110° C., and reaction time is 2 min.

As shown in the drawing, with reaction of the raw material gas 16g, the protection film 16 generated by chemical reaction is deposited on surfaces of the adjacent metal thin wires 14 and the substrate 11. The film formation speed of the protection film 16 may be 100 nm/min, for example. In an initial stage of the film formation, the protection film 16 is deposited on the bottom surfaces 12a, the side surfaces 13a, the top surfaces 13b, and outer peripheries of the metal thin wires 14. As the reaction proceeds, the protection film 16 grows in a manner so as to cover the metal thin wires 14. Additionally, a distance between adjacent protection films 16 formed around adjacent metal thin wires 14 is gradually narrowed by an amount of thickness of the grown protection film 16.

Figure 4B:
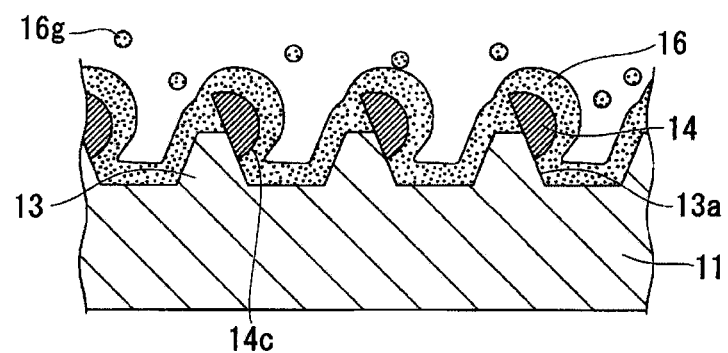

Next, as shown in FIG. 4B, when the reaction further proceeds, the distance between the adjacent metal thin wires 14 is narrowed by the amount of the thickness of the protection film 16. This almost hinders entry of the raw material gas 16g into the grooved portions 12. Accordingly, reactions of the raw material gas 16g occur one after another in the protection film 16 formed on the metal thin wires 14 before the raw material gas 16g enters into the grooved portions 12, resulting that formation of the protection film 16 proceeds preferentially on the metal thin wires 14.

In that case, if reaction speed is slow, there is a sufficient time to allow the raw material gas 16g to spread into the grooved portions 12 even when the distance between the metal thin wires 14 is narrowed by the thickness of the protection film 16. Accordingly, the protection film 16 is not formed preferentially on the metal thin wires 14 and the reaction proceeds on an entire surface. Thereby, formation of the protection film 16 allows the grooved portions 12 to be gradually buried. However, it is not desirable that the grooved portions 12 are buried, in terms of optical characteristics. Therefore, in the present embodiment, with high reaction speed, the grooved portions 12 are formed.

Each of the metal thin wires 14 of the embodiment is protruded like a peaked portion from one of the side surfaces 13a of the protruded thread 13 to the Y-axis direction. On the surface of the metal thin wire 14 thus formed, in order to allow the protection film 16 to be deposited near a lower end portion of the metal thin wire 14 indicated by a reference numeral 14c, it is necessary that the raw material gas 16g enters into the grooved portion 12, flows round the metal thin wire 14, and then reaches the lower end portion 14c. Accordingly, deposition of the protection film 16 is extremely difficult on the lower end portion 14c. Depending on reaction conditions, the metal thin wire 14 may be exposed out in the space 15 at the lower end portion 14c.

Figure 4C:
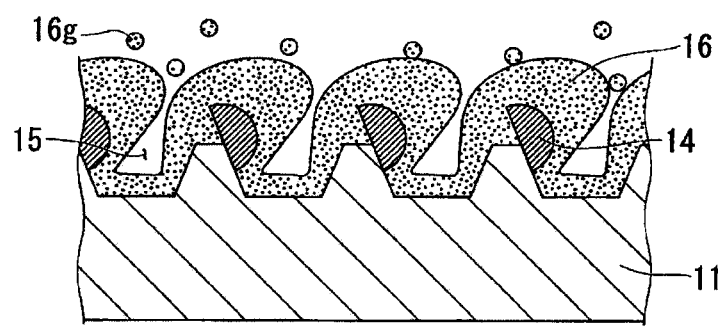

Next, as shown in FIG. 4C, as the reaction further proceeds, adjacent protection films 16 continuously growing on the adjacent metal thin wires 14 abut with each other. Thereby, between the adjacent metal thin wires 14 is formed the space 15 surrounded by the protection film 16.

Figure 4D:
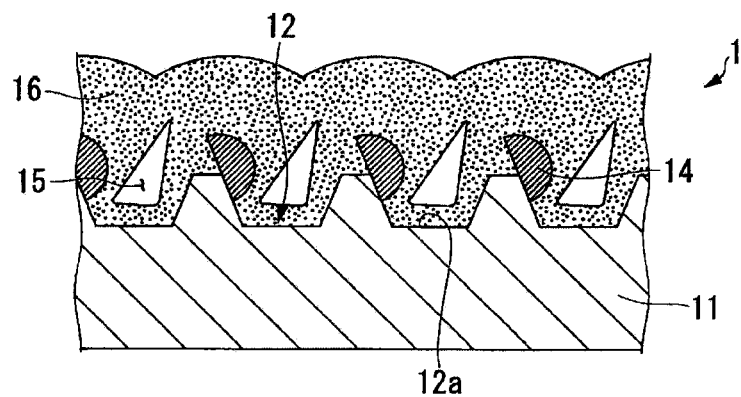

Next, as shown in FIG. 4D, as the reaction still further proceeds, a front surface of the protection film 16 is gradually flattened, resulting in formation of the protection film 16 having a large thickness. In this manner, the polarizing element 1 of the embodiment is completed.

In the polarizing element 1 thus formed, the metal thin wires 14 are protected by the protection film 16, so that oxidization of the metal thin wires 14 can be prevented. Additionally, the space 15 is formed in the region between the respective portions including the protruded threads 13 and the metal thin wires 14, whereby the polarizing element 1 can be highly reliable and can have excellent optical characteristics.

In the embodiment, the second protection films 16b provided on the upper end portions 14b of the adjacent metal thin wires 14 contact with each other in a direction parallel to an arrangement axis direction. Accordingly, between the metal thin wires 14 is formed the space 15 capable of enclosing the air or an atmospheric gas upon formation processing (or a vacuum), thereby allowing the polarizing element 1 to have excellent optical characteristics.

Additionally, in the embodiment, the protection film 16 is made of a translucent insulation material. Since the metal thin wires 14 are covered with the insulation material to be insulated from surrounding members. Thus, for example, when the polarizing element 1 is incorporated in an electronic apparatus, no electric current flows between the metal thin wires 14 and wires of the apparatus.

In the method for producing the polarizing element 1 thus formed, when forming the metal thin wires 14, the presence of the remaining resist 21 can prevent deposition of a metal material on an unnecessary portion. Additionally, since the metal material is deposited both on the protruded thread 13 and on the remaining resist 21, there can be obtained a wide area for deposition, thereby securing a sufficient amount of deposition. In addition, the protection film 16 protects and reinforces the metal thin wires 14, thus preventing deterioration and damage induced due to oxidization of the metal thin wires 14. Consequently, the polarizing element 1 having excellent optical characteristics can be easily produced.

Furthermore, in the embodiment, the CVD process is used to form the protection film 16. The CVD process is characterized by high-speed film formation. Thereby, as the film formation proceeds, film formation reactions occur before the raw material gas 16g spreads in the space 15, and the protection film grows preferentially on the upper end portion of each of the metal thin wires 14. Then, growth of the film between the metal thin wires 14 stops and thus the region between the metal thin wires 14 is not buried in the protection film 16, thereby facilitating production of the polarizing element 1 having excellent optical characteristics.

Additionally, in the embodiment, the metal thin wires 14 are protected only by the protection film 16. Alternatively, a plurality of deposition films may be laminated furthermore on the protection film 16.

Projection Display

Figure 6:
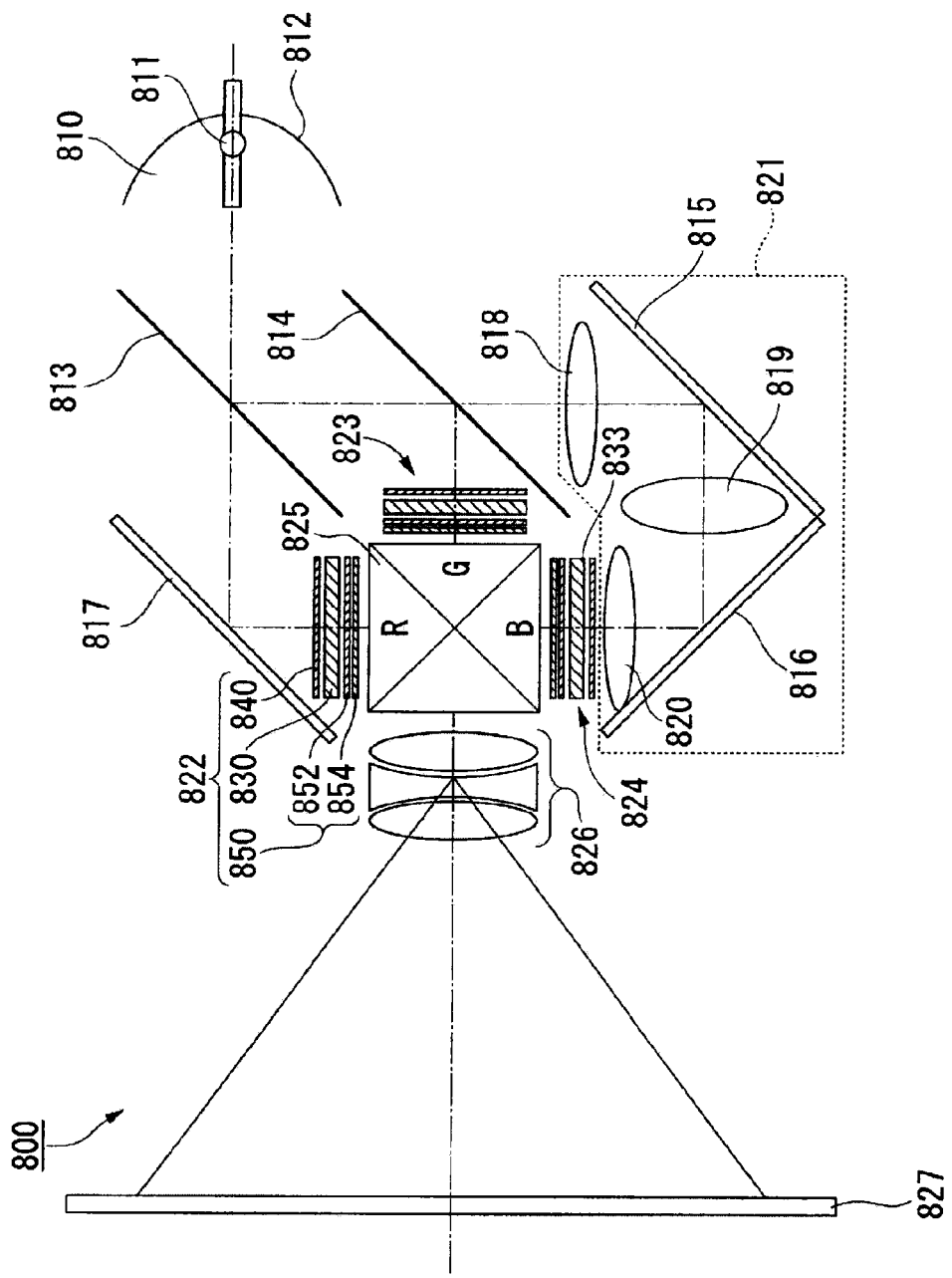
FIG. 6 is a schematic structural view of a projector as an electronic apparatus according to an embodiment of the invention.

Next, a description will be given of an electronic apparatus according to an embodiment of the invention. A projector 800 shown in FIG. 6 includes a light source 810, dichroic mirrors 813 and 814, reflecting mirrors 815, 816, and 817, an incident lens 818, a relay lens 819, an output lens 820, light modulation sections 822, 823, and 824, a cross dichroic prism 825, and a projection lens 826.

The light source 810 includes a lamp 811 such as a metal halide lamp, and a reflector 812 reflecting light of the lamp. As the light source 810, besides the metal halide lamp, there may be mentioned an ultra-high pressure mercury lamp, a flash mercury lamp, a high pressure mercury lamp, a deep UV lamp, a xenon lamp, a xenon flash lamp, or the like.

The dichroic mirror 813 transmits red light included in white light from the light source 810 and reflects blue light and green light. The transmitted red light is reflected by the reflecting mirror 817 to be input to the light modulation section 822 for red light. Of the blue light and the green light reflected by the dichroic mirror 813, the green light is reflected by the dichroic mirror 814 and input to the light modulation section 823 for green light. The blue light is transmitted through the dichroic mirror 814 and input to the light modulation section 824 for blue light via a relay optical system 821 including the incident lens 818, the relay lens 819, and the output lens 820 provided to prevent optical loss due to a long optical path.

In each of the light modulation sections 822 to 824, on opposite sides of a liquid crystal light valve 830 are arranged an input polarizing element 840 and an output polarizing element section 850 so as to sandwich the light valve 830 therebetween. The input polarizing element 840 and the output polarizing element section 850 are positioned such that transmission axes of the polarizing element 840 and the polarizing element section 850 intersect with each other (a cross nicol arrangement).

The input polarizing element 840 is a reflecting polarizing element that reflects light of a vibration direction orthogonal to the transmission axis.

The output polarizing element section 850 includes a first polarizing element (a pre-polarization plate or a pre-polarizer) 852 and a second polarizing element 854. The first polarizing element 852 corresponds to the above-described polarizing element according to the embodiment of the invention. The second polarizing element 854 is a polarizing element made of an organic material. In the output polarizing element section 850, the polarizing elements 852 and 854 are both a light-absorbing polarizing element and work together to absorb light.

In general, such a light-absorbing polarizing element made of an organic material tends to deteriorate due to heat and thus cannot be used as a polarization unit for a large power projector requiring a high level of luminance. However, in the projector 800 of the embodiment, the first polarizing element 852 made of an inorganic material having high thermal resistance is arranged between the second polarizing element 854 and the liquid crystal light valve 830, and the polarizing elements 852 and 854 cooperate to absorb light. Thereby, deterioration of the second polarizing element 854 made of an organic material is suppressed.

The three color light beams modulated by the respective light modulation sections 822 to 824 are input to the cross dichroic prism 825. The cross dichroic prism 825 is formed by adhering together four square prisms. On interfaces of the square prisms are formed a dielectric multilayer reflecting red light and a dielectric multilayer reflecting blue light in an X-letter shape. The three color light beams are synthesized by the dielectric multilayers to generate light representing color images. The synthesized light is projected on a screen 827 by the projection lens 826, whereby color images are enlarged to be displayed.

In the projector 800 thus formed, the output polarizing element section 850 includes the polarizing element of the embodiment described above, so that deterioration of the polarizing element can be suppressed even when using a high power light source. Accordingly, the projector 800 can be highly reliable and can have excellent display characteristics.

Liquid Crystal Device

Figure 7:
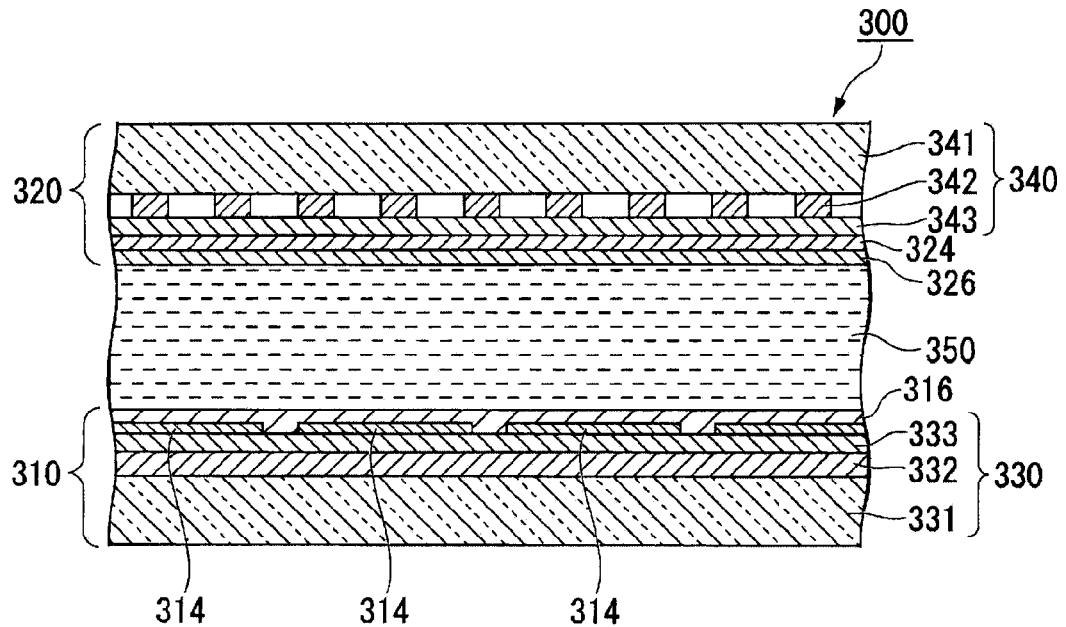
FIG. 7 is a schematic structural view showing an example of a liquid crystal device according to an embodiment of the invention, the device including the polarizing element of the embodiment.

FIG. 7 is a schematic sectional view showing an example of a liquid crystal device 300 according to an embodiment of the invention. The liquid crystal 300 includes the polarizing element of the embodiment. The liquid crystal device 300 of the embodiment is formed by providing a liquid crystal layer 350 between an element substrate 310 and an opposing substrate 320.

The element substrate 310 and the opposing substrate 320, respectively, include polarizing elements 330 and 340, respectively. The polarizing elements 330 and 340 are both the polarizing element of the described-above polarizing element of the embodiment and have a structure in which metal thin wires with the protection film are formed on a substrate made of a transparent material such as glass, quartz, or plastic.

The polarizing element 330 includes a substrate main body 331 and a metal thin wire 332, and the polarizing element 340 includes a substrate main body 341 and a metal thin wire 342. In the embodiment, the substrate main bodies 331 and 341 correspond to the substrate of each of the polarizing elements and also correspond to a substrate of the liquid crystal device. In addition, the metal thin wire 332 and the metal thin wire 342 intersect with each other. In each of the polarizing elements 330 and 340, the metal thin wires are arranged on an inner surface side of the element (a side of the each element facing the liquid crystal layer 350).

On the inner surface side of the polarizing element 330 are provided a pixel electrode 314, a not-shown wire, and a TFT element, along with an alignment film 316. Similarly, on the inner surface side of the polarizing element 340 are provided a common electrode 324 and an alignment film 326.

In the liquid crystal device thus formed, the substrate main bodies 331 and 341 serve as the substrate for the liquid crystal device and the substrate for the polarizing element, so that a total number of components can be reduced. Thus, a thickness of the liquid crystal device as a whole can be reduced, thereby improving a function of the liquid crystal device 300. Furthermore, since the device structure is simplified, the production of the liquid crystal device can be facilitated and cost reduction can be promoted.

Electronic Apparatus

Figure 8:
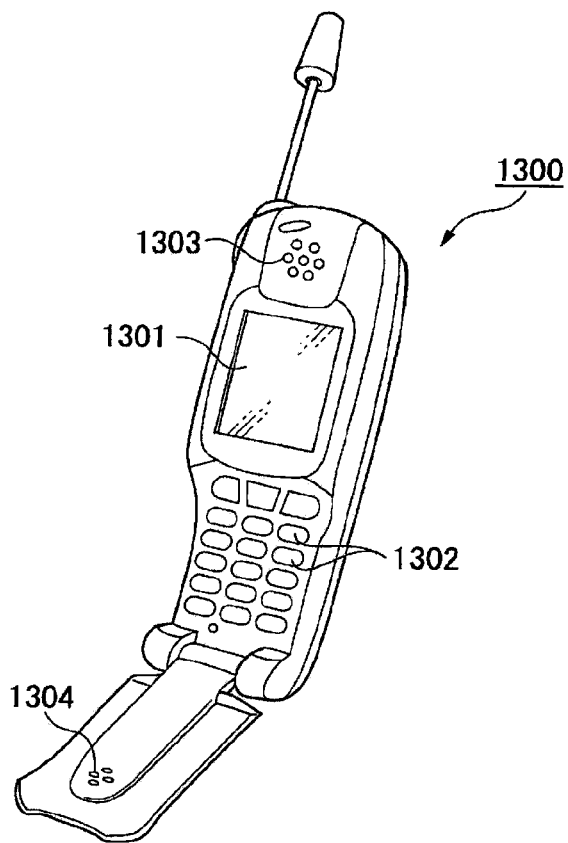
FIG. 8 is a perspective view of a mobile phone as an electronic apparatus according to another embodiment of the invention

Next, a description will be given of an electronic apparatus according to an embodiment of the invention. FIG. 8 is a perspective view showing an example of the electronic apparatus including the liquid crystal device of FIG. 7. A mobile phone (an electronic apparatus) 1300 shown in FIG. 8 includes the liquid crystal device of the embodiment as a small display section 1301, a plurality of operation buttons 1302, an earpiece 1303, and a mouthpiece 1304. Thereby, the mobile phone 1300 can be highly reliable and can obtain a display section achieving high-quality display.

Furthermore, besides the above mobile phone, the liquid crystal device of the embodiment can be suitably used as an image displaying unit for an electronic book, a personal computer, a digital still camera, a liquid crystal television, a view finder type or direct view type video tape recorder, a car navigation device, a pager, an electronic organizer, an electronic calculator, a word processor, a work station, a TV phone, a point-of-sale (POS) terminal, an apparatus with a touch panel, or the like.

While some preferred embodiments of the invention have been described with reference to the accompanying drawings, it is obvious that the invention is not restricted to the embodiments. The shapes of the constituent members and the combination of the members shown in the embodiments are merely examples, and various modifications and changes can be made based on design requirements or the like without departing from the scope of the invention.

What is claimed is:

1. A polarizing element, comprising:
    a substrate;
    a plurality of protruded threads formed on one of surfaces of the substrate in a rough stripe pattern when viewed two-dimensionally, each of the protruded threads having a side surface forming a slope inclined with respect to the one surface of the substrate;
    a plurality of metal thin wires each formed on the slope of the each protruded thread so as to be cantilever-supported by the slope and each extended in an extension direction of the protruded thread; and
    a protection film covering the protruded threads and the metal thin wires.

2. The polarizing element according to claim 1, wherein a region between adjacent pairs of the protruded thread and the metal thin wire includes a space that is not filled with the protection film.

3. The polarizing element according to claim 1, wherein an upper end surface of the protruded thread is roughly flat, and the each metal thin wire is protruded from the slope toward the upper end surface of the protruded thread in a manner so as to cover at least a part of the upper end surface when viewed two-dimensionally.

4. The polarizing element according to claim 1, wherein parts of the protection film covering adjacent pairs of the protruded thread and the metal thin wire contact with each other at an upper portion of the space formed between the adjacent pairs of the protruded thread and the metal thin wire.

5. The polarizing element according to claim 1, wherein the protection film is made of a translucent insulation material.

6. The polarizing element according to claim 1, wherein the metal thin wires are made of a metal selected among silicon, germanium, and molybdenum.

7. A method for producing a polarizing element that includes a plurality of protruded threads formed on one of surfaces of a substrate in a rough stripe pattern when viewed two-dimensionally, and a mask formed on an upper portion of each of the protruded threads, the method comprising:

forming a plurality of metal thin wires each extended along the each protruded thread, each of the metal thin wires being made of a metal material deposited both on one of side surfaces of the protruded thread and on one side surface of the mask adjacent to the one side surface of the protruded thread;

removing the mask; and forming a protection film covering the metal thin wires by a chemical vapor deposition process in such a manner that a region between adjacent pairs of the protruded thread and the metal thin wire includes a space that is not filled with the protection film.

8. The method for producing a polarizing element according to claim 7, wherein the one side surface of the mask is a slope that covers at least a part of the upper portion of the each protruded thread when viewed two-dimensionally.

9. The method for producing a polarizing element according to claim 7, wherein, before the metal thin wire formation step, the protruded thread formation step forms a resist having a predetermined pattern on one of surfaces of a base member forming the substrate and etches the base member via the resist to obtain the substrate having the protruded threads formed in the predetermined pattern, and the mask formation step forms the mask by using a part of the resist left on the upper portion of each of the protruded threads.

10. A projection display, comprising:
an illumination optical system that outputs light;
a liquid crystal light valve that modulates the light;
the polarizing element of claim 1 that receives the light modulated by the liquid crystal light valve; and
a projection optical system that projects polarized light transmitted through the polarizing element on a projected surface.

11. A liquid crystal device including a pair of substrates, a liquid crystal layer provided between the substrates, and the polarizing element of claim 1 formed on a surface of at least one of the substrates, the surface facing the liquid crystal layer.

12. An electronic apparatus including the liquid crystal device of claim 11.

* * * * *